United States Patent
Keller et al.

(10) Patent No.: US 8,955,271 B2
(45) Date of Patent: Feb. 17, 2015

(54) SLIDING DOOR ASSEMBLY

(71) Applicant: Steelcase Inc., Grand Rapids, MI (US)

(72) Inventors: Ralf Keller, Rosenheim (DE); Ryan Geister, Alto, MI (US); Helmut Petrat, Rosenheim (DE); Theodore M. Haan, Byron Center, MI (US); Andreas Borchhardt, Buch am Erlbach (DE)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 14/029,164

(22) Filed: Sep. 17, 2013

(65) Prior Publication Data

US 2014/0075853 A1    Mar. 20, 2014

Related U.S. Application Data

(60) Provisional application No. 61/702,018, filed on Sep. 17, 2012, provisional application No. 61/702,008, filed on Sep. 17, 2012, provisional application No. 61/701,977, filed on Sep. 17, 2012, provisional application No. 61/701,969, filed on Sep. 17, 2012.

(51) Int. Cl.
| | |
|---|---|
| *E06B 3/32* | (2006.01) |
| *E06B 3/04* | (2006.01) |
| *E04B 2/74* | (2006.01) |
| *E04B 2/78* | (2006.01) |

(Continued)

(52) U.S. Cl.
CPC ............... *E04B 2/7453* (2013.01); *E06B 3/32* (2013.01); *E04B 2/78* (2013.01); *E06B 3/4654* (2013.01); *E04B 2/72* (2013.01); *E06B 1/00* (2013.01); *E06B 1/52* (2013.01); *E05C 1/08* (2013.01); *E06B 3/36* (2013.01); *E04B 2/00* (2013.01); *E04H 1/06* (2013.01); *E04B 2/56* (2013.01); *E04B 2/721* (2013.01); *E04B 1/82* (2013.01); *E05B 65/006* (2013.01); *E05C 1/06* (2013.01); *E05B 15/0053* (2013.01)
USPC ................ 52/207; 52/213; 52/217; 52/243.1; 52/243; 49/409

(58) Field of Classification Search
CPC ................ E06B 3/42; E06B 3/46; E06B 3/32
USPC .......... 52/207, 213, 217, 656.2, 656.7, 656.4, 52/656.1, 243.1, 243; 49/409, 410, 411, 49/505
See application file for complete search history.

(56) References Cited

U.S. PATENT DOCUMENTS

| | | |
|---|---|---|
| 685,547 A | 10/1901 | Whiting |
| 1,651,570 A | 12/1927 | Woodcock |

(Continued)

*Primary Examiner* — Phi A
(74) *Attorney, Agent, or Firm* — Price Heneveld LLP (57) ABSTRACT

A modular wall assembly includes a frame assembly that includes at least one vertical frame member and at least one horizontal frame member, wherein the frame assembly is configured to define a door opening, a door member slidably operable between a closed position, wherein the door member is at least partially located within the door opening, and an open position, wherein the door member is at least partially removed from with the door opening to allow ingress and egress through the door opening, and a support assembly that includes a sliding support member that slidably supports the door member between the open and closed positions, and at least one mounting arrangement coupling the sliding support member, wherein the at least one mounting arrangement allows vertical adjustment of the sliding support member with respect to the frame assembly.

11 Claims, 10 Drawing Sheets

(51) Int. Cl.

| | | |
|---|---|---|
| *E06B 3/46* | (2006.01) | |
| *E04B 2/72* | (2006.01) | |
| *E06B 1/00* | (2006.01) | |
| *E06B 1/52* | (2006.01) | |
| *E05C 1/08* | (2006.01) | |
| *E06B 3/36* | (2006.01) | |
| *E04B 2/00* | (2006.01) | |
| *E04H 1/06* | (2006.01) | |
| *E04B 2/56* | (2006.01) | |
| *E04B 1/82* | (2006.01) | |
| *E05B 65/00* | (2006.01) | |
| *E05C 1/06* | (2006.01) | |
| *E05B 15/00* | (2006.01) | |

(56) References Cited

U.S. PATENT DOCUMENTS

| | | | | |
|---|---|---|---|---|
| 1,736,693 | A | 11/1929 | Behen | |
| 1,974,151 | A | 9/1934 | Da Pra | |
| 2,062,229 | A | 11/1936 | Lewis | |
| 2,075,074 | A | 3/1937 | Wierk, Jr. | |
| 2,180,112 | A | 11/1939 | Jones | |
| 2,344,278 | A | 3/1944 | Balousek | |
| 2,379,193 | A | 6/1945 | Shields | |
| 2,627,092 | A | 2/1953 | Grossman | |
| 2,699,204 | A | 1/1955 | Davis | |
| 2,710,422 | A | 6/1955 | Nelson | |
| 2,722,318 | A | 11/1955 | Brown | |
| 2,790,209 | A | 4/1957 | Thompson | |
| 2,798,578 | A | 7/1957 | Toth | |
| 2,843,872 | A | 7/1958 | Hannon | |
| 2,857,633 | A | 10/1958 | Bunker | |
| 2,858,408 | A | 10/1958 | Barroero | |
| 2,863,183 | A | 12/1958 | Carlson | |
| 2,911,242 | A * | 11/1959 | Bickerstaff, Jr. | 403/188 |
| 2,912,713 | A | 11/1959 | Nelson | |
| 2,918,708 | A | 12/1959 | Sharp | |
| 2,931,434 | A | 4/1960 | Steel | |
| 2,934,802 | A | 5/1960 | Shekter | |
| 2,942,308 | A | 6/1960 | Naeser | |
| 2,950,756 | A | 8/1960 | Moloney | |
| 2,954,592 | A | 10/1960 | Parsons | |
| 3,009,984 | A | 11/1961 | Lindgren | |
| 3,072,977 | A | 1/1963 | Burda | |
| 3,117,657 | A | 1/1964 | Bruno | |
| 3,126,589 | A | 3/1964 | Monti | |
| 3,189,140 | A | 6/1965 | Luss | |
| 3,374,580 | A | 3/1968 | Ruff | |
| 3,407,553 | A * | 10/1968 | Halpern | 52/217 |
| 3,418,753 | A | 12/1968 | Hanson | |
| 3,466,801 | A | 9/1969 | Bohn | |
| 3,504,456 | A * | 4/1970 | Claud, Jr. | 49/470 |
| 3,563,626 | A | 2/1971 | Ferdinand | |
| 3,566,561 | A * | 3/1971 | Tozer | 52/127.12 |
| 3,604,152 | A * | 9/1971 | Protzman | 49/470 |
| 3,611,637 | A | 10/1971 | Saino | |
| 3,656,260 | A | 4/1972 | Weaver et al. | |
| 3,668,807 | A | 6/1972 | Thompson | |
| 3,677,614 | A | 7/1972 | Radek | |
| 3,802,480 | A | 4/1974 | Daggy | |
| 3,839,834 | A | 10/1974 | Goddard | |
| 3,879,912 | A * | 4/1975 | Cox | 52/213 |
| 3,987,588 | A * | 10/1976 | Imperial et al. | 49/501 |
| 4,001,974 | A * | 1/1977 | Wright | 49/489.1 |
| 4,015,368 | A | 4/1977 | Court et al. | |
| 4,064,924 | A | 12/1977 | Catlett | |
| 4,143,497 | A | 3/1979 | Offenbacher | |
| 4,148,535 | A | 4/1979 | Fenwick | |
| 4,171,052 | A | 10/1979 | Winn | |
| 4,222,542 | A | 9/1980 | Wilson et al. | |
| 4,262,450 | A | 4/1981 | Anderson | |
| 4,283,884 | A | 8/1981 | Dumenil et al. | |
| 4,381,115 | A | 4/1983 | Ko | |
| 4,395,854 | A | 8/1983 | White et al. | |
| 4,401,222 | A | 8/1983 | Kulikowski et al. | |
| 4,413,446 | A | 11/1983 | Dittrich | |
| 4,425,738 | A | 1/1984 | Christensen | |
| 4,447,989 | A | 5/1984 | Mailand et al. | |
| 4,464,864 | A | 8/1984 | Yackiw | |
| 4,474,402 | A | 10/1984 | Shelton | |
| 4,478,003 | A | 10/1984 | Flett | |
| 4,479,330 | A | 10/1984 | Muller | |
| 4,509,292 | A | 4/1985 | Konle | |
| 4,513,554 | A * | 4/1985 | Johnson et al. | 52/657 |
| 4,513,555 | A * | 4/1985 | Johnson | 52/657 |
| 4,535,578 | A * | 8/1985 | Gerken | 52/243.1 |
| 4,561,210 | A | 12/1985 | Kvas et al. | |
| 4,571,889 | A | 2/1986 | Labelle | |
| 4,574,547 | A | 3/1986 | Menchetti et al. | |
| 4,586,552 | A | 5/1986 | Labelle | |
| 4,614,060 | A | 9/1986 | Dumenil et al. | |
| 4,656,783 | A | 4/1987 | Ahonen | |
| 4,660,477 | A | 4/1987 | Kortering et al. | |
| 4,680,828 | A | 7/1987 | Cook et al. | |
| 4,712,331 | A | 12/1987 | Fujiwara | |
| 4,720,936 | A | 1/1988 | Ellingson | |
| 4,805,345 | A | 2/1989 | Ohi | |
| 4,817,538 | A | 4/1989 | Michaelsen | |
| 4,831,780 | A | 5/1989 | Bockwinkel | |
| 4,852,302 | A | 8/1989 | Berniola Gil | |
| 4,884,371 | A * | 12/1989 | Gagnon | 49/501 |
| 4,941,289 | A | 7/1990 | Rolek | |
| 4,947,584 | A | 8/1990 | Wexler | |
| 4,970,102 | A | 11/1990 | Guillon | |
| 5,010,691 | A | 4/1991 | Takahashi | |
| 5,067,280 | A | 11/1991 | Arima | |
| 5,125,202 | A | 6/1992 | Kissinger | |
| 5,168,669 | A | 12/1992 | Knapp | |
| 5,218,799 | A * | 6/1993 | Appino | 52/213 |
| 5,260,529 | A * | 11/1993 | Miller | 200/61.43 |
| 5,261,188 | A | 11/1993 | Vaughan | |
| 5,321,924 | A * | 6/1994 | Smolik | 52/204.1 |
| 5,367,831 | A | 11/1994 | Gunkel | |
| 5,373,793 | A | 12/1994 | Crossman | |
| 5,446,998 | A | 9/1995 | Arima | |
| 5,463,831 | A | 11/1995 | Shinagawa et al. | |
| 5,475,946 | A | 12/1995 | Howe | |
| 5,481,076 | A * | 1/1996 | Mullet et al. | 200/61.43 |
| 5,522,180 | A | 6/1996 | Adler | |
| 5,551,193 | A | 9/1996 | Barnett | |
| 5,581,951 | A | 12/1996 | Ryan et al. | |
| 5,634,300 | A | 6/1997 | Huebner et al. | |
| 5,675,946 | A | 10/1997 | Verbeek et al. | |
| 5,786,547 | A | 7/1998 | Zielinski | |
| 5,921,026 | A * | 7/1999 | Miller | 49/27 |
| 5,943,825 | A | 8/1999 | Procton et al. | |
| 5,950,366 | A | 9/1999 | Uhlmeyer | |
| 5,966,879 | A | 10/1999 | Verbeek et al. | |
| 6,019,331 | A | 2/2000 | Hoogland et al. | |
| 6,058,665 | A | 5/2000 | Halvorson, Jr. et al. | |
| 6,082,047 | A | 7/2000 | Comaglio et al. | |
| 6,125,584 | A | 10/2000 | Sanders | |
| 6,151,852 | A | 11/2000 | Linn et al. | |
| 6,152,523 | A | 11/2000 | Schonebeck | |
| 6,195,939 | B1 | 3/2001 | Sowers | |
| 6,250,016 | B1 | 6/2001 | Gravel | |
| 6,289,643 | B1 * | 9/2001 | Bonar | 52/207 |
| 6,374,545 | B1 | 4/2002 | Baczuk | |
| 6,415,553 | B1 | 7/2002 | Krayer, Jr. et al. | |
| 6,442,901 | B1 * | 9/2002 | Rissone | 49/470 |
| 6,487,978 | B1 | 12/2002 | Hamberg | |
| 6,557,303 | B2 | 5/2003 | Finke et al. | |
| 6,773,080 | B2 | 8/2004 | Chen et al. | |
| 6,776,423 | B1 | 8/2004 | Guht | |
| 6,830,299 | B2 | 12/2004 | Henriott et al. | |
| 6,945,002 | B2 * | 9/2005 | Zambelli et al. | 52/630 |
| 7,363,749 | B2 | 4/2008 | Sultan et al. | |
| 7,494,101 | B2 | 2/2009 | Chen | |
| 7,568,311 | B2 | 8/2009 | Shivak et al. | |
| 7,707,790 | B2 | 5/2010 | Williams et al. | |
| 7,743,558 | B2 | 6/2010 | Jakob-Bamberg et al. | |
| 7,849,633 | B2 | 12/2010 | Oshima et al. | |
| 7,861,474 | B2 | 1/2011 | Houle et al. | |

(56) References Cited

U.S. PATENT DOCUMENTS

| | | | |
|---|---|---|---|
| 7,886,501 B2 * | 2/2011 | Bartlett et al. | 52/800.1 |
| 7,913,459 B2 | 3/2011 | Ball et al. | |
| 8,056,286 B2 | 11/2011 | Gosling et al. | |
| 8,061,539 B2 | 11/2011 | Punzel et al. | |
| 8,112,954 B2 | 2/2012 | Gosling et al. | |
| 8,177,079 B2 | 5/2012 | Schwartzkopf et al. | |
| 8,181,394 B2 | 5/2012 | Michaels | |
| 8,215,061 B2 | 7/2012 | Gosling et al. | |
| 8,381,445 B2 | 2/2013 | Hans | |
| 8,387,332 B2 | 3/2013 | Piano | |
| 8,393,114 B2 * | 3/2013 | Haab et al. | 49/425 |
| 2004/0003556 A1 | 1/2004 | Zerbst | |
| 2004/0010973 A1 | 1/2004 | Lio et al. | |
| 2004/0111972 A1 | 6/2004 | Dintheer | |
| 2007/0251180 A1 | 11/2007 | Gosling et al. | |
| 2008/0148643 A1 | 6/2008 | Lemming | |
| 2008/0173779 A1 | 7/2008 | Beno et al. | |
| 2008/0302020 A1 | 12/2008 | Gosling et al. | |
| 2008/0302021 A1 | 12/2008 | Gosling et al. | |
| 2009/0056228 A1 | 3/2009 | Picchio | |
| 2009/0077895 A1 | 3/2009 | Tshai | |
| 2010/0058688 A1 | 3/2010 | Goodard | |
| 2010/0199596 A1 | 8/2010 | Gosling et al. | |
| 2010/0205868 A1 | 8/2010 | Williams et al. | |
| 2011/0271601 A1 | 11/2011 | Flory et al. | |
| 2012/0017516 A1 | 1/2012 | Gosling et al. | |
| 2012/0079771 A1 | 4/2012 | Meulemans | |
| 2012/0198786 A1 * | 8/2012 | Williams | 52/656.4 |
| 2013/0219792 A1 | 8/2013 | Parker | |

\* cited by examiner

SLIDING DOOR ASSEMBLY

CROSS REFERENCE TO RELATED APPLICATIONS

This application claims benefit of U.S. Provisional Application No. 61/702,018, filed Sep. 17, 2012, entitled "FLOOR-TO-CEILING PARTITION WALL ASSEMBLY"; U.S. Provisional Application No. 61/702,008, filed Sep. 17, 2012, entitled "VERTICALLY ADJUSTABLE DOOR ASSEMBLY"; U.S. Provisional Application No. 61/701,977, filed Sep. 17, 2012, entitled "MONITOR MOUNT ASSEMBLY"; and U.S. Provisional Application No. 61/701,969, filed Sep. 17, 2012, entitled "SLIDING DOOR ASSEMBLY", the entire contents of which are incorporated herein by reference.

BACKGROUND OF THE INVENTION

The present invention relates to a sliding door assembly, and in particular to a sliding door assembly employable within a floor-to-ceiling wall partition assembly.

BRIEF SUMMARY OF THE INVENTION

One aspect of the present invention is to provide a modular wall assembly that comprises a frame assembly including at least one vertical frame member and at least one horizontal frame member, wherein the frame assembly is configured to define a door opening, a door member slidably operable between closed and open positions, and a support assembly that includes a sliding support member that slidably supports the door member between the open and closed positions, and at least one mounting arrangement releasably coupling the sliding support member to the frame assembly, wherein the at least one mounting arrangement allows vertical adjustment of the sliding support member with respect to the frame assembly.

Another aspect of the present invention is to provide a modular wall assembly that comprises a frame assembly including at least one vertical frame member and at least one horizontal frame member, wherein the frame assembly is configured to define a door opening, a door member slidably operable between closed and open positions, and a support assembly that includes a sliding support member that slidably supports the door member between the open and closed positions, and at least one mounting arrangement coupling the sliding support member to the frame assembly, wherein at least one of the at least one vertical frame member and the at least one horizontal frame member includes a plurality of apertures, and wherein the at least one mounting arrangement engages the plurality of apertures to removably couple the at least one mounting arrangement with the frame assembly.

Still yet another aspect of the present invention is to provide a modular wall assembly that comprises a frame assembly including at least on vertical frame member and at least one horizontal frame member, wherein the frame assembly is configured to define a door opening, a door member slidably operable between closed and open positions, and a seal arrangement extending along a lower edge of the door member and including a housing having a first portion attached to the lower edge of the door member, and a second portion selectively engageable with the first portion between a plurality of vertically-spaced positions, the seal arrangement further including a seal member extending downwardly from the second portion of the housing and adapted to abut a floor surface.

These and other features and advantages of the present invention will be further understood and appreciated by those skilled in the art by reference to the following specification, claims, and appended drawings.

BRIEF DESCRIPTION OF THE DRAWINGS

FIG. 3;

DETAILED DESCRIPTION OF THE PREFERRED EMBODIMENTS

Figure 1:
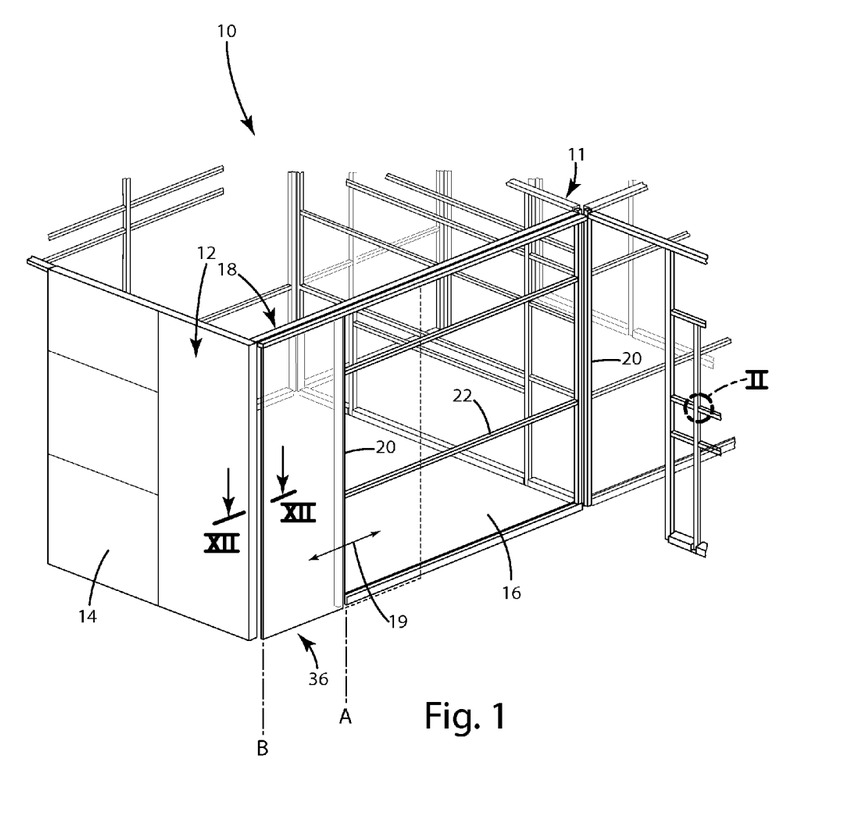
FIG. 1 is a perspective view of a floor-to-ceiling wall partition assembly including a sliding door assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Figure 2:
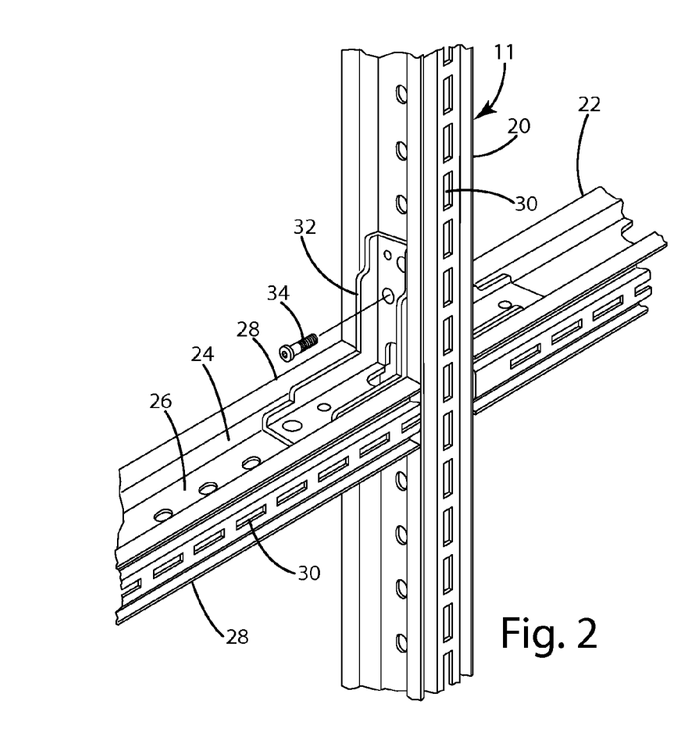
FIG. 2 is an enlarged perspective view of the area II, FIG. 1.

The reference numeral 10 (FIG. 1) generally designates a floor-to-ceiling partition wall assembly that includes a frame assembly 11 supporting a plurality of panel assemblies 12, including opaque or solid panel assemblies 14 and translucent or glass panel assemblies 16, and a sliding door assembly 18 embodying the present invention. The frame assembly 11 includes a plurality of vertical frame members 20 and a plurality of horizontal frame members 22 extending between and coupled with the vertical frame members 20. Each of the vertical frame members 20 (FIG. 2) and the horizontal frame members 22 have an H-shaped cross-sectional configuration and include channels 24 defining a web portion 26 therebetween, and a pair of oppositely disposed outer portions 28 each having a rectangularly-shaped cross-sectional configuration and a plurality of mounting slots 30 spaced longitudinally along the length of the associated frame member 20, 22. The horizontal frame members 22 are coupled with the associated vertical frame members 20 by a plurality of L-shaped corner brackets 32 that are received within the channels 24 and are secured to the frame members 20, 22 by a plurality of mechanical fasteners such as screws 34.

Figure 3:
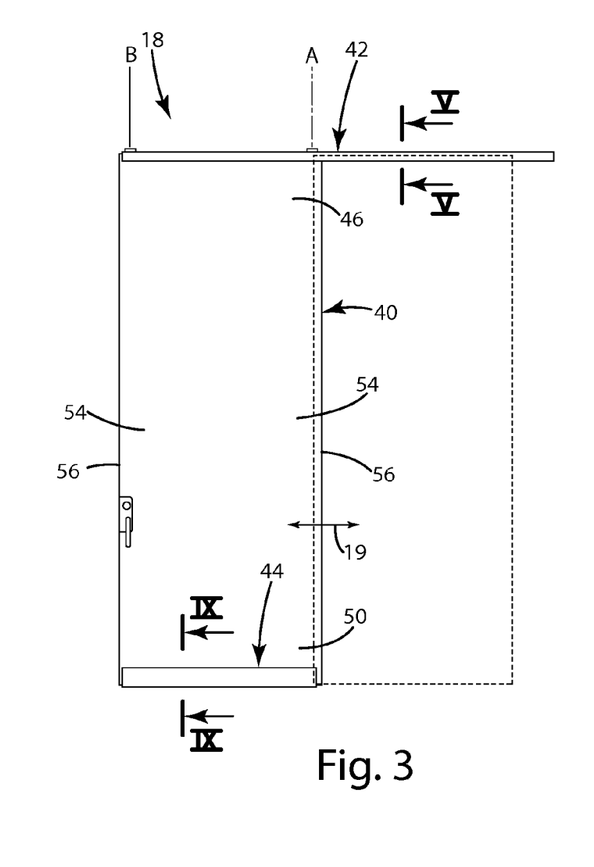
FIG. 3 is a front elevational view of the sliding door assembly, wherein a door member is shown in a closed position in solid line and an open position in dashed line.
Figure 4:
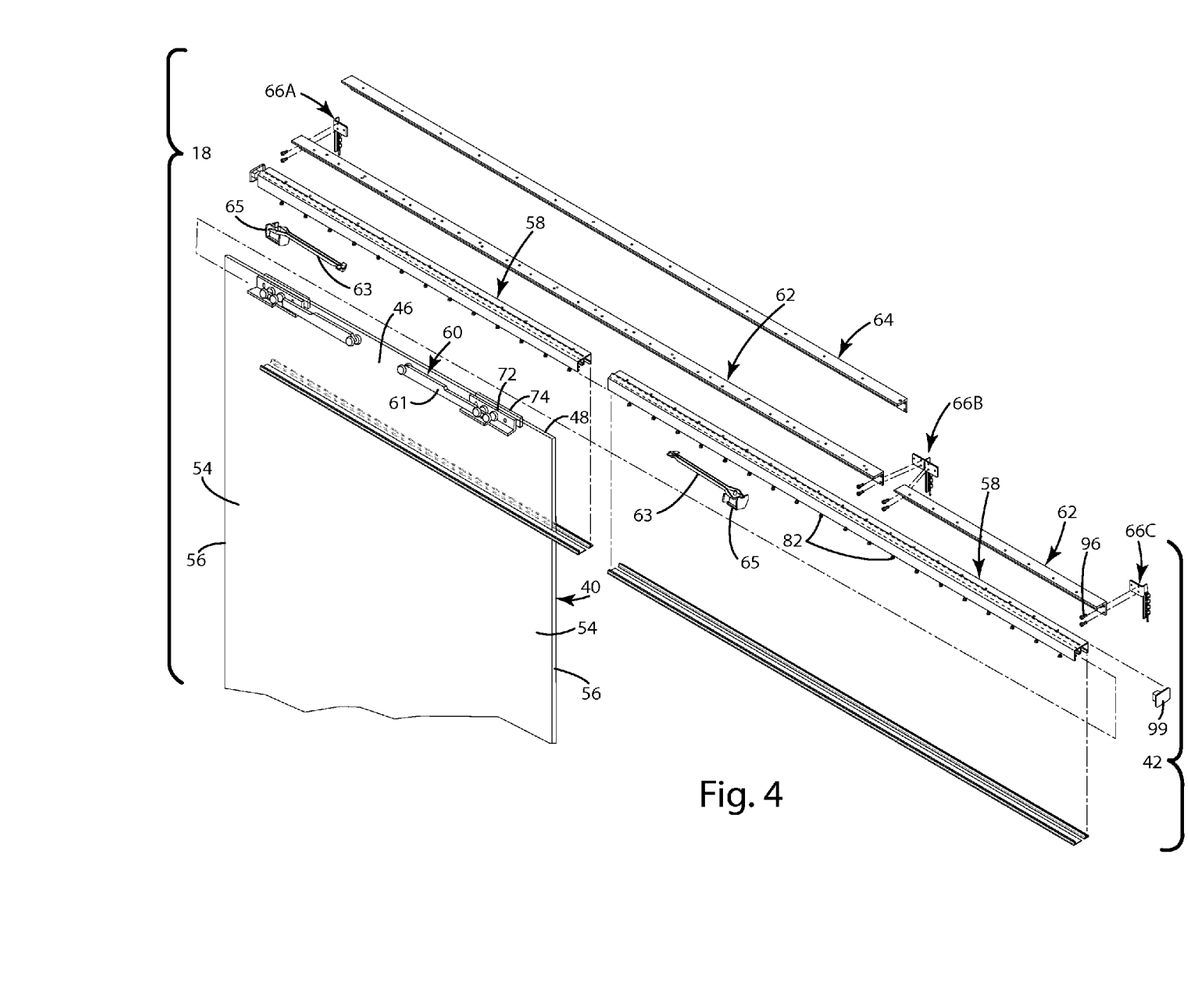
FIG. 4 is an exploded perspective view of the sliding door assembly.

The sliding door assembly 18 (FIGS. 1 and 3) is movable in a direction 19 between an open position A allowing ingress and egress through a doorway opening 36, and a closed position B, wherein the door assembly 18 covers the doorway opening 36. In the illustrated example, the sliding door assembly 18 includes a glass door panel 40, a sliding rail assembly 42, and a drop seal assembly 44. The glass door panel 40 includes an upper portion 46 having a top edge 48 (FIG. 4), a lower portion 50 having a bottom edge 52 (FIG. 9), and a pair of side portions 54 each including a side edge 56.

Figure 5A:
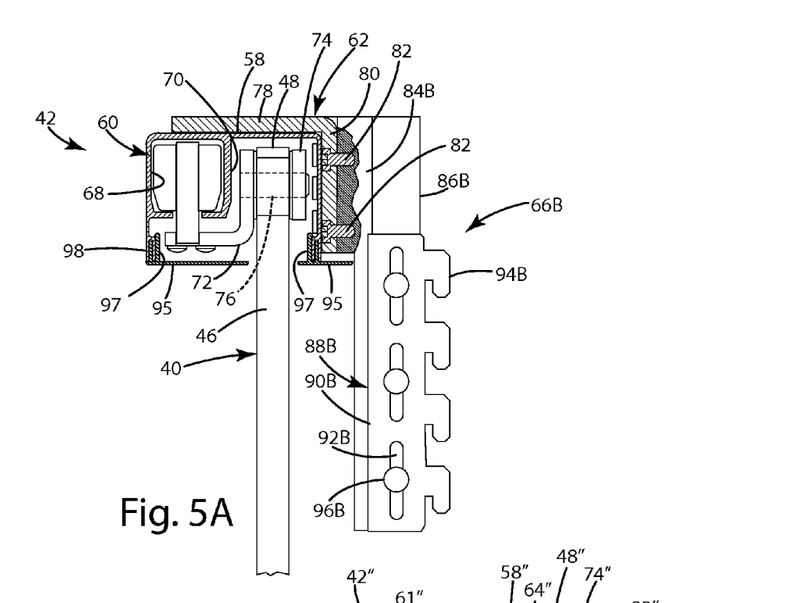
FIG. 5A is a cross-sectional view of a sliding rail assembly taken along the line V-V, FIG. 3.

In the illustrated example, the sliding rail assembly 42 (FIGS. 4 and 5A) includes a runner rail 58 (FIG. 5A) supporting a roller assembly 60 and housing the top edge 48 of the door panel 40, a mounting rail 62 supporting the runner rail 58, a reinforcement member 64 reinforcing the mounting rail 62, and a plurality of mounting assemblies 66A, 66B, 66C spaced along the length of the mounting rail 62 and supporting the mounting rail 62 from the associated vertical frame members 20 of the frame assembly 11. The runner rail 58 has a downwardly opening, C-shaped cross-sectional configuration and includes a first channel 68 that slidably receives the roller assemblies 60 therein, and a second channel 70 that houses the upper portion 46 of the door panel 40 as the door panel 40 moves between the open and closed positions A, B. Each roller assembly 60 is attached to a first attachment bracket 72 having an L-shaped cross-sectional configuration and cooperating with a second attachment bracket 74 and is coupled thereto via a plurality of mechanical fasteners 76, thereby sandwiching the upper portion 46 of the door panel 40 between the first and second attachment brackets 72, 74 and supporting the door panel 40 from the roller assemblies 60. Each roller assembly 60 includes a rolling damper 61 that dampens the sliding motion of the door panel 40 as it approaches the fully open and fully closed positions A, B, and is actuated via a damping actuator 63. In the illustrated example, each damping actuator 63 is connected to an associated stop member 65 that prevents the door panel 40 from moving beyond the fully open and fully closed positions A, B.

Figure 5B:
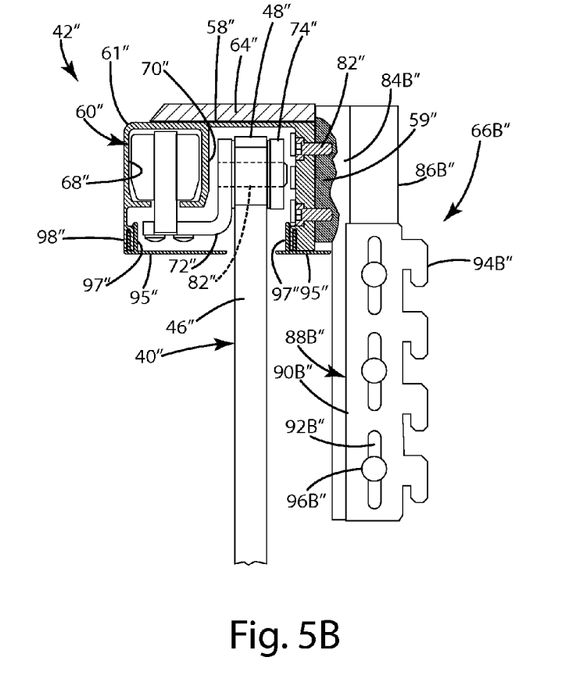
FIG. 5B is a cross-sectional view of an alternative embodiment of the sliding rail assembly.

In those applications where the runner rail 58 spans a plurality of vertical frame members 20, each mounting rail 62 is provided with an L-shaped cross-sectional configuration including a horizontal leg 78 and a vertical leg 80, wherein the runner rail 58 is coupled to the vertical leg 80 of the mounting rail 62 and a mounting portion 84 of one of the mounting assemblies 66A, 66B, 66C by a plurality of mechanical fasteners such as screws 82 (as described below). In the illustrated example, the runner rail 58 and the mounting rail 62 may be provided as multiple pieces spanning different lengths depending on the distance between vertical frame members 20 from which the sliding rail assembly 42 is supported. In certain other applications, the span between vertical frame members 20 is significant enough that the reinforcement member 64 is provided to reinforce the runner rail 58 and the mounting rail 62. The reinforcement member 64 is provided an L-shaped cross-sectional configuration similar to the mounting rail 62. The mounting rail 62 is supported from the vertical frame members 20 of the frame assembly 11 by the plurality of mounting assemblies 66. In certain configurations, the runner rail 58 may be mounted directly to the mounting assemblies 66A, 66B, 66C and utilized without the mounting rail 62 and/or the reinforcement member 64. As best illustrated in FIG. 5B, an alternative embodiment of the sliding rail assembly 42" is shown as including the runner rail 58" and the reinforcement member 64". Since the rail assembly 42 is similar to the rail assembly 42, similar parts appearing in FIGS. 5A and 5B, respectively, are represented by the same, corresponding reference numeral except for "'"" in the numerals of the latter. The sliding rail assembly 42" is similar in construction and configuration to the sliding rail assembly 42 with the most notable exception being the configuration of the runner rail 58" and the reinforcement member 64". In the illustrated example, the runner rail 58" includes a relatively thicker sidewall 59" that is secured to the mounting portion 84B" of the mounting assembly 66B" via the screws 82", such that the sidewall 59" of the runner rail 58" directly abuts the mounting portion. The reinforcement member 64" has an elongated planar configuration and is secured to an upper wall 61" of the runner rail 58" via a plurality of mechanical fasteners such as screws or bolts (not shown).

Figure 6A:
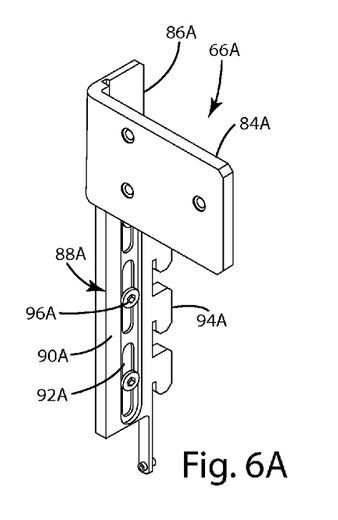
FIGS. 6A-6C are perspective views of mounting assemblies of the sliding door assembly.
Figure 6B:
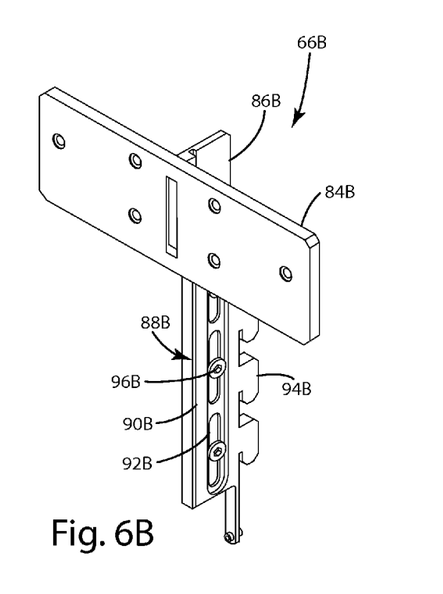
Figure 6C:
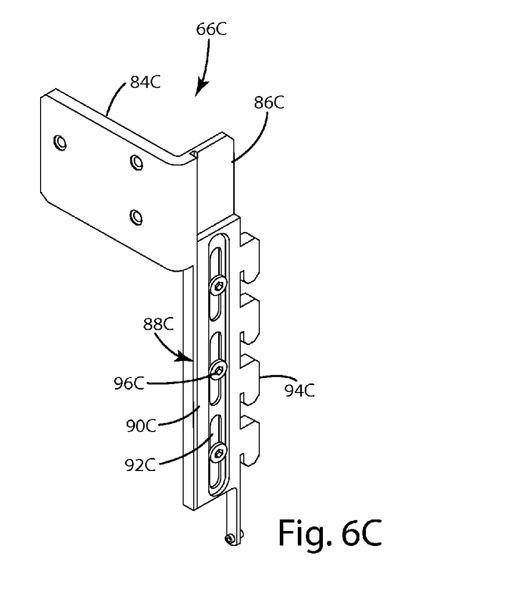

As best illustrated in FIGS. 6A-6C, the mounting assemblies are provided in various configurations, including a right side mounting assembly 66A, a center mounting assembly 66B and a left side mounting assembly 66C. Since each of the mounting assemblies 66A, 66B, 66C are similar in construction and assembly, similar parts appearing in FIGS. 6A-6C are represented by the same, corresponding reference numeral, except for the suffixes "A" "B" and "C" after the numerals respectively. By way of example, the mounting assembly 66A includes a planar mounting portion 84A and a support portion 86A extending downwardly and perpendicularly from the mounting portion 84A. The mounting assembly 66A further includes the hook member 88A having a body portion 90A with a plurality of elongated apertures 92A spaced along the length thereof, and a plurality of downwardly-extending hooks 94A extending rearwardly from the body portion 90A and spaced longitudinally along the length thereof.

In assembly, each mounting assembly 66A, 66B, 66C is assembled with the associated vertical frame members 20 by inserting the hooks 94A, 94B, 94C into the slots 30 of the vertical frame members 20. The relative vertical position of the mounting portion 84A, 84B, 84C of each mounting assembly 66A, 66B, 66C is then adjusted by aligning the mounting portion 84A, 84B, 84C with components of the frame assembly 11. A plurality of mechanical fasteners, such as screws 96A, 96B, 96C are then tightened, thereby securing the support portion 84A, 84B, 84C of the hook assembly 66A, 66B, 66C at the selected vertical position. The hook assemblies 88A, 88B, 88C are then removed from engagement with the vertical frame members 20 and attached to the remaining components of the slider rail assembly 42. The door panel 40 and the slider rail assembly 42 are then assembled, and the overall door assembly 18 is hung from the vertical frame members 20 by the mounting assemblies 66A, 66B, 66C, thereby allowing the door assembly 18 to be mounted in a proper relationship with respect to a ceiling structure.

Figure 7:
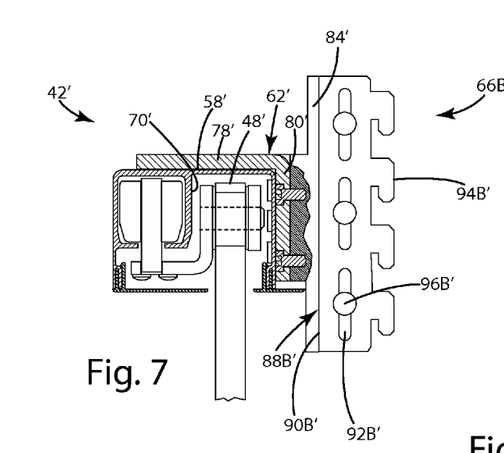
FIG. 7 is a cross-sectional view of an alternative transom or mid-height mounted sliding rail assembly.
Figure 8A:
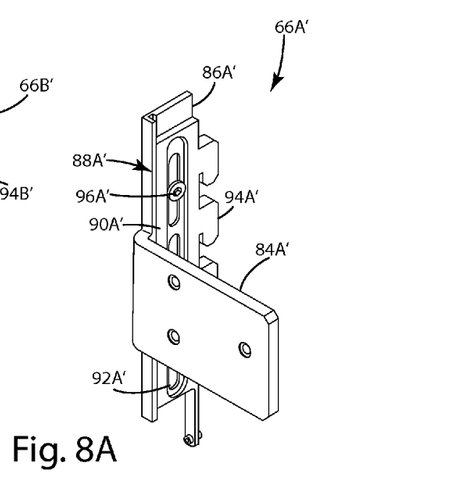
FIGS. 8A-8C are perspective views of mounting assemblies of the alternative transom or mid-height mounted rail assembly.
Figure 8B:
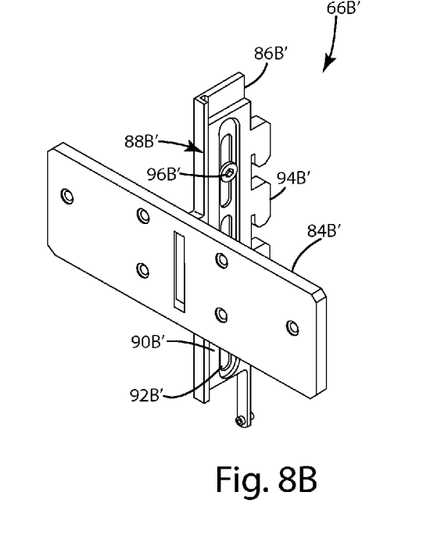
Figure 8C:
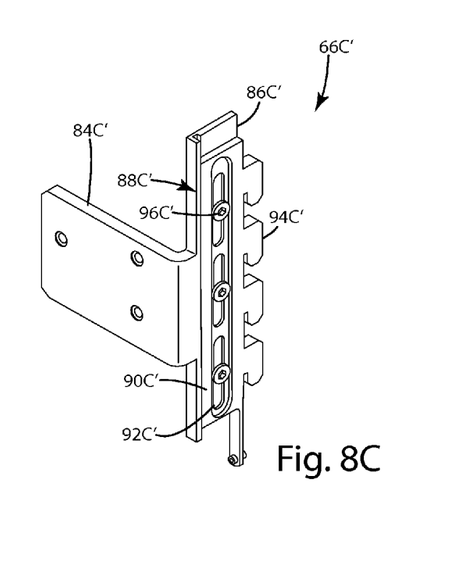

As best illustrated in FIGS. 7-8C, the sliding rail assembly 42' may also be configured to support the sliding door assembly 18 at a transom height, i.e., a height below the uppermost horizontal frame member 22, or a position spaced from an associated ceiling height. Since the sliding rail assembly 42' is similar to the previously described sliding rail assembly 42, similar parts appearing in FIGS. 5 and 6A-6C and FIGS. 7-8C, respectively are represented by the same, corresponding reference numeral, except for the "'" in the numerals of the latter. In the illustrated example, the mounting assemblies 66A', 66B', 66C' are each configured such that the mounting portion 84A', 84B', 84C' are positioned at a midpoint along the length of the support portion 86A', 86B', 86C', respectively.

Figure 9:
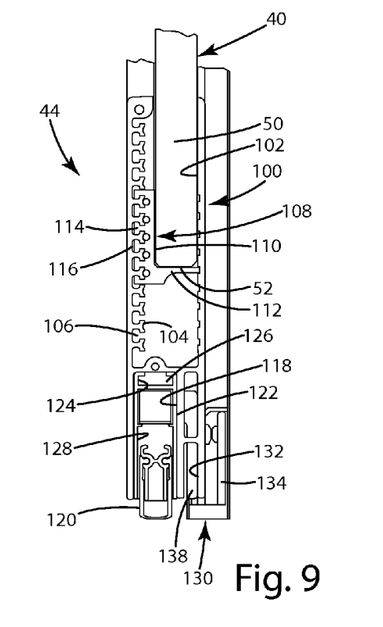
FIG. 9 is a cross-sectional view of a drop seal arrangement taken along the line IX-IX.
Figure 10:
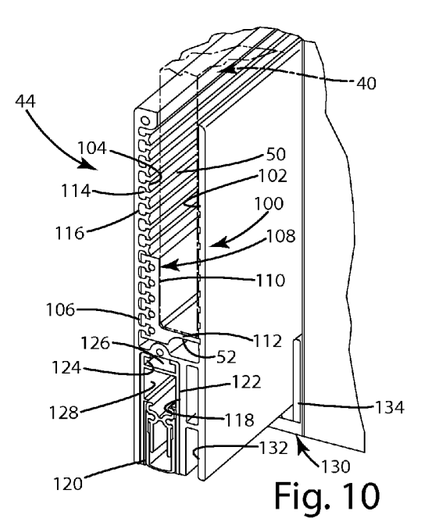
FIG. 10 is a perspective cross-sectional view of the drop seal arrangement.
Figure 11A:
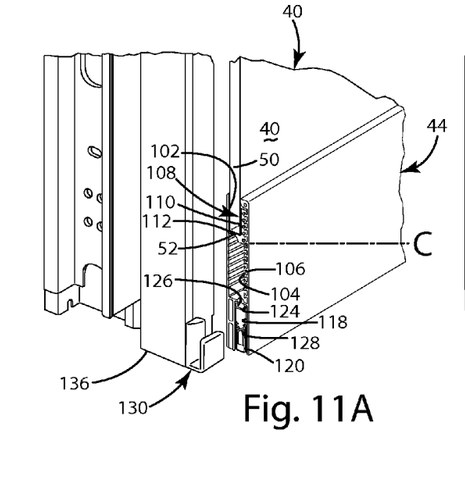
FIGS. 11A is a perspective cross-sectional view of the drop seal arrangement, with a drop seal member in an uppermost position.
Figure 11B:
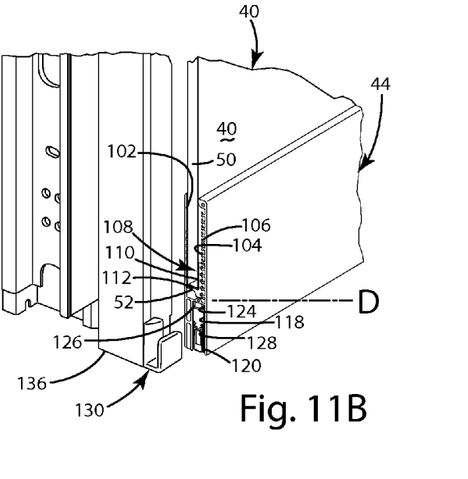
FIG. 11B is a perspective cross-sectional view of the drop seal arrangement, with a drop seal member in a lowermost position.

As best illustrated in FIGS. 9 and 10, the drop seal assembly 44 includes a housing 100 including an upwardly opening channel that receives the lower portion 50 of the door panel 40 therein and which includes a plurality of longitudinally extending slats 104 each having a T-shaped cross-sectional configuration and defining a plurality of slots therebetween. The drop seal assembly 44 further includes an alignment member 108 having a vertically extending body portion 110 and an alignment portion 112 extending perpendicularly from the body portion 110 and abutting the bottom edge 52 of the panel 40. In the illustrated example, the body portion 110 includes a plurality of longitudinally extending slats 114 each having a T-shaped cross-sectional configuration and defining a plurality of slots 116 therebetween. In assembly, the slats 114 and slots 116 of the alignment member 108 engage the slots 106 and slats 104 of the housing 100, thereby allowing the drop seal assembly 44 to be vertically positioned at a select height between an uppermost position C (FIG. 11A) and a lowermost position D (FIG. 11B) with respect to the bottom edge 52 of the door panel 40.

Figure 12:
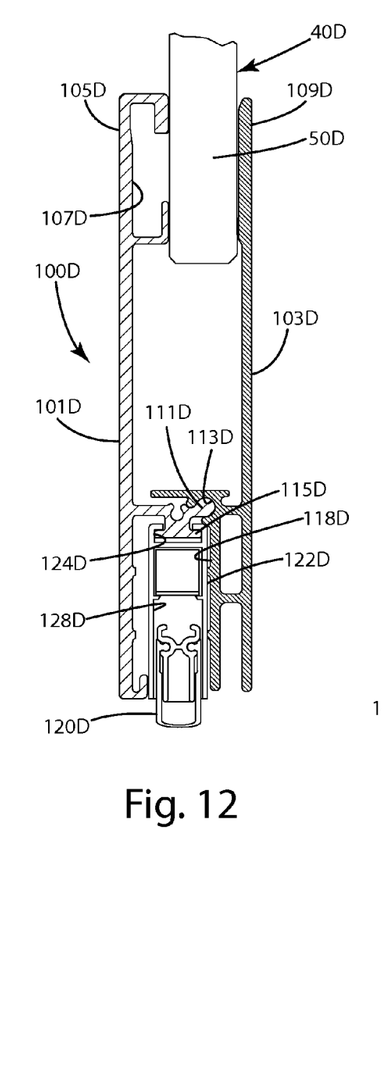
FIG. 12 is a cross-sectional view of an alternative embodiment of the drop seal arrangement.

The reference numeral 44D (FIG. 12) generally designates another embodiment of the drop seal assembly. Since the drop seal assembly 44D is similar to the drop seal assembly 44, similar parts appearing in FIGS. 9 and 10 and FIG. 12 are represented by the same, corresponding reference numeral, except for the suffix "D" in the numerals of the latter. The drop seal assembly 44D is similar to the drop seal assembly 44 with the most notable exception being the configuration of the housing 100D and it attachment to the associated door panel 40D. In the illustrated example, the housing 100D includes a first portion 101D facing an exterior of the door panel 40D, and a second portion 103D facing an interior of the door panel 40D. The first portion 101D includes an upper portion 105D having a C-shaped channel 107D, while the second portion 103D includes an upper portion 109D that cooperates with the upper portion 105D of the first portion 101D to sandwich the lower portion 50D of the door panel 40D therebetween. The first portion 101D and the second portion 103D are each preferably secured to the door panel 40D via an adhesive, however, other suitable attachment methods may also be utilized. The first portion 101D of the housing 100D further includes a ball 111D of an elongated ball-and-socket type arrangement, while the second portion 103D includes a socket 113D of the elongated ball-and-socket arrangement that snappingly receives the ball 111D therein, thereby attaching the first portion 101D to the second portion 103D. The first portion 101D further includes a downwardly-extending T-shaped tab 115D received within an upwardly-opening, longitudinally-extending channel 124D.

Referring to the embodiment of the housing 100 as illustrated in FIGS. 9-11B, the housing 100 further includes longitudinally extending, downwardly opening channel 118 which houses a seal member 120 therein. A longitudinally extending seal support member 122 includes an upwardly opening C-shaped channel 124 that engages the longitudinally extending, T-shaped tab 126, and a downwardly opening channel 128 that receives the U-shaped, flexibly resilient seal member 120 therein, such that the seal member 120 abuts an associated floor surface. Alternatively, the seal member 120 may be replaced with a plate-like member for those configurations requiring vertical adjustment of the assembly 44, but not requiring an acoustical seal.

A pair of guide members 130 engage a second downwardly extending channel 132, thereby guiding the sliding door assembly 18 as it is moved between the open and closed positions A, B. Specifically, each guide member 130 is provided a C-shaped cross-sectional configuration including a body portion secured to a trim member 136 covering an associated vertical frame member 20, and a guide portion 138 that is received within the channel 132.

Figure 13:
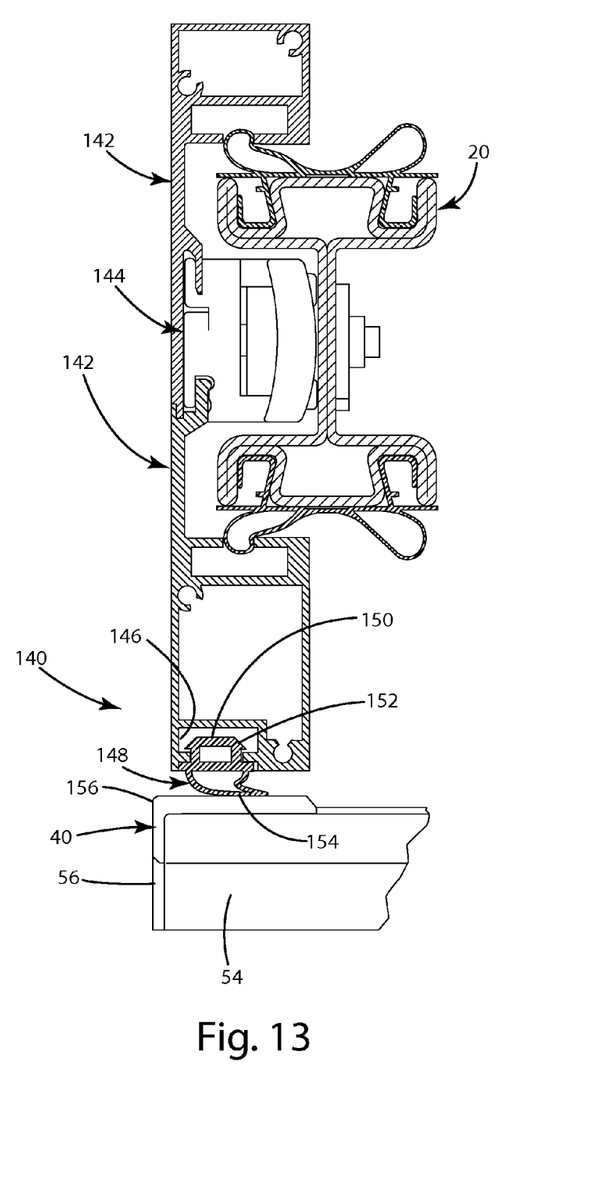
FIG. 13 is a cross-sectional view of a vertical seal arrangement taken along the line XII-XII, FIG. 1.
Figure 14A:
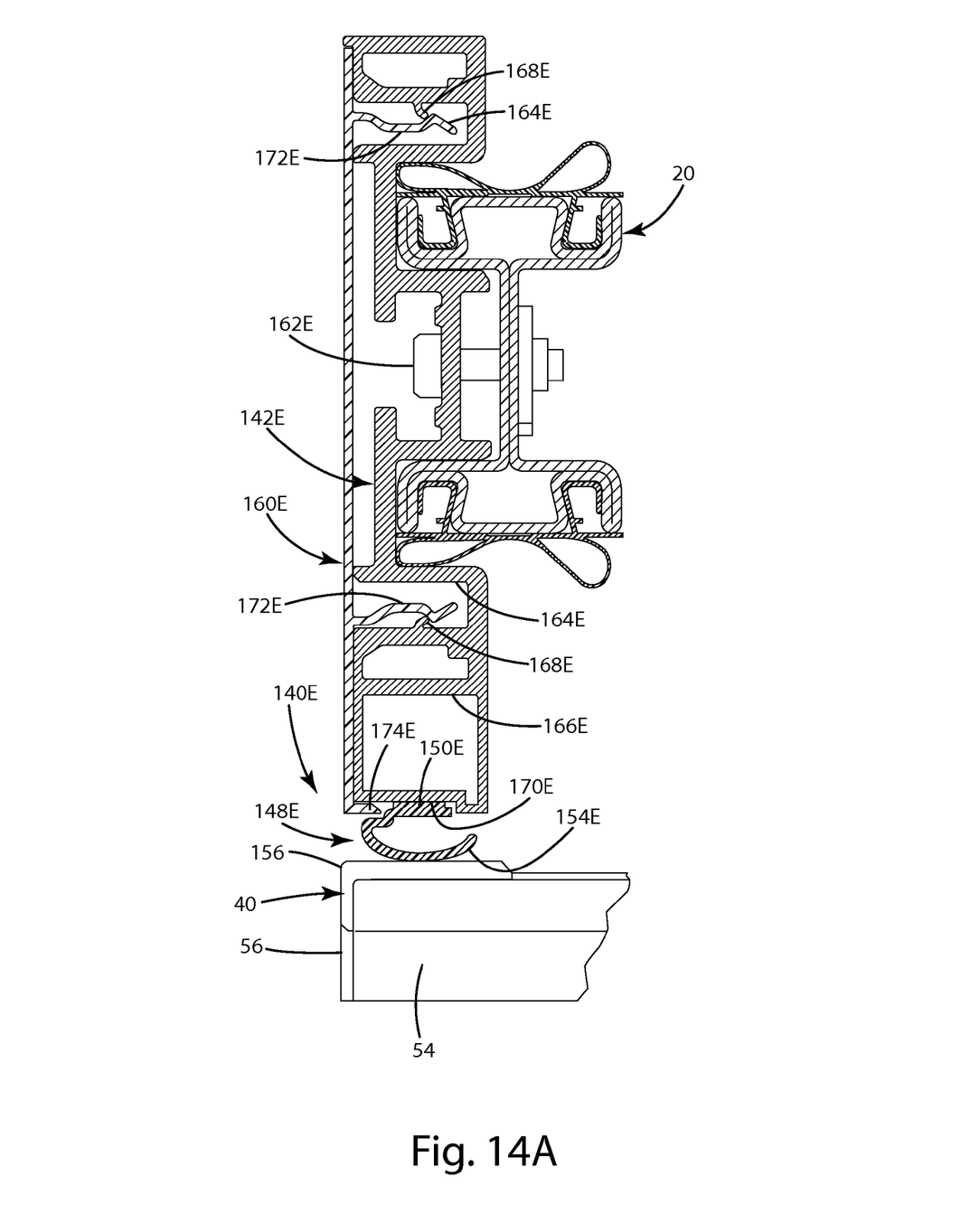
FIG. 14A is a cross-sectional view of an alternative embodiment of the vertical seal arrangement.

As best illustrated in FIG. 13, the sliding door assembly 18 further includes a vertical seal arrangement 140 sealing the side portions 54 of the door panel 40 with respect to the frame assembly 11. A pair of cooperating vertical trim members 142 are attached to an associated vertical frame member 20 by an attachment arrangement 144. One of the vertical trim members 142 includes a longitudinally extending, outwardly opening channel 146 that supports a seal member 148 therein. Specifically, the flexibly resilient seal member 148 extends vertically along the trim member 142 and includes a first portion 150 having a pair of tabs 152 that engage the channel 146, thereby mounting the seal member 148 to the vertical trim member 142. The seal member 148 includes a second portion 154 that abuts an L-shaped trim strip 156 abutting a side edge 56 of the door panel 40 and secured to the door panel 40 by an adhesive. It is noted that the trim strip 156 extends inwardly from an inner surface of the door panel 40 and that second portion 154 of the seal member 148 is adapted to abut the trim strip 156 when the sliding door assembly 18 is in the closed position B, and that the second portion 154 is spaced from and does not abut the inner surface of the door panel 40 as the door assembly 18 is moved between the open and closed positions A, B. Alternatively, the trim member 142E is provided as a single, unitary extruded member that is aesthetically finished via a trim cover 160E. In the illustrated example, the trim member 142E is secured to the associated vertical frame member 20 via a plurality of mechanical fasteners, such as bolts 162E, and includes a pair of laterally-opening, elongated channels 164E and an outwardly-opening channel 166E. Each of the channels 164E includes a longitudinally-extending tab 168E. The trim member 142E includes a pair of inwardly and longitudinally extending, flexibly resilient engagement portions 172E that are received within the channels 164E of the trim member 142E and releasably engage the corresponding tabs 168E, thereby removably securing the trim cover 160E to the trim member 142E. The trim cover 160E further includes an inwardly-turned tab portion 174E that wraps about an end wall 170E of the trim member 142E. In assembly, a C-shaped member 148E is secured to the end wall 170E of the trim member 142E via an adhesive, although other suitable attachment arrangements could be utilized.

Figure 14B:
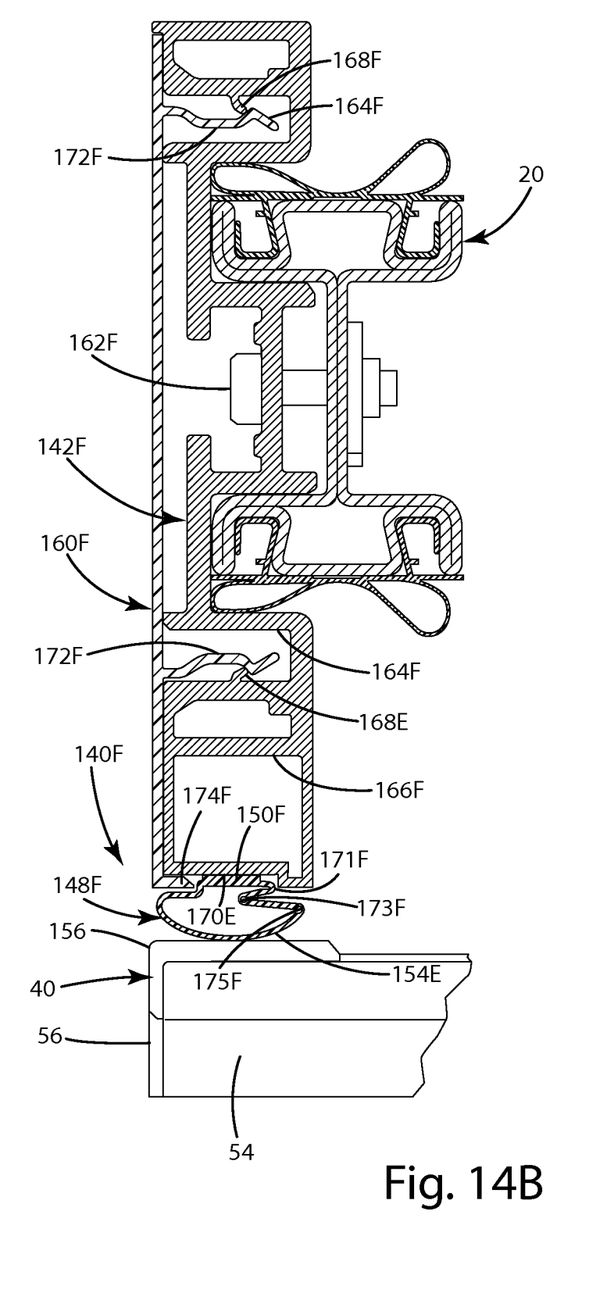
FIG. 14B is a cross-sectional view of a second alternative embodiment of the vertical seal arrangement.

The reference numeral 148F (FIG. 14B) generally designates an alternative embodiment of the seal member. Since the overall trim member 142F and the trim cover 160F is similar to the previously described trim member 142E and the trim cover 160E, similar parts appearing in FIG. 14A and FIG. 14B respectively are represented by the same corresponding reference numeral, except of the suffix "F" in the numerals of the latter. In the illustrated example, the seal member 148F includes the first portion 150F comprising a relatively hard polypropylene and the second portion 154F comprising a relatively soft ethylene propylene diene monomer or EPDM rubber, wherein the second portion includes longitudinally-extending first, second and third living hinges 171F, 173F, 175F.

In the foregoing description, it will readily appreciated by those skilled in the art that modifications may be made to the invention without departing from the concepts as disclosed. Such modifications are to be considered as included in the following claims, unless these claims by their language expressly state otherwise.

The invention claimed is:

1. A modular wall assembly, comprising:
  a frame assembly including at least one vertical frame member and at least one horizontal frame member, wherein the frame assembly is configured to define a door opening;
  a door member slidably operable between a closed position, wherein the door member is at least partially located within the door opening, and an open position, wherein the door member is at least partially removed from within the door opening to allow ingress and egress through the door opening; and
  a support assembly that includes a sliding support member that slidably supports the door member between the open and closed positions, and at least one mounting arrangement releasably coupling the sliding support member to the frame assembly, wherein the at least one mounting arrangement allows vertical adjustment of the sliding support member with respect to the frame assembly;
  the frame assembly includes at least one aperture, and wherein the at least mounting arrangement includes a mounting member that engages the at least one aperture of the frame assembly;
  the at least one aperture includes a plurality of vertically apertures;
  the plurality of apertures are vertically spaced from one another;
  the at least one vertical frame member includes the plurality of apertures.

2. The modular wall assembly of claim 1, wherein the mounting member includes a plurality of hooks that releasably engage the plurality of apertures.

3. The modular wall assembly of claim 1, wherein the sliding support member comprises an elongated track.

4. The modular wall assembly of claim 1, wherein the modular wall assembly comprises a floor-to-ceiling wall assembly.

5. A modular wall assembly, comprising:
  a frame assembly including at least one vertical frame member and at least one horizontal frame member, wherein the frame assembly is configured to define a door opening;
  a door member slidably operable between a closed position, wherein the door member is at least partially located within the door opening, and an open position, wherein the door member is at least partially removed from within the door opening to allow ingress and egress through the door opening; and
  a support assembly that includes a sliding support member that slidably supports the door member between the open and closed positions, and at least one mounting arrangement coupling the sliding support member to the frame assembly, wherein at least one of the at least one vertical frame member and the at least one horizontal frame member includes a plurality of apertures, and wherein the at least one mounting arrangement engages the plurality of apertures to removable couple the at least one mounting arrangement with the frame assembly.

6. The modular wall assembly of claim 5, wherein the plurality of apertures are vertically spaced from one another.

7. The modular wall assembly of claim 5, wherein the vertical frame member includes the plurality of apertures.

8. The modular wall assembly of claim 5, wherein the mounting member includes a plurality of hooks that releasably engage the plurality of apertures.

9. The modular wall assembly of claim 5, wherein the sliding support member comprises an elongated track.

10. The modular wall assembly of claim 5, wherein the modular wall assembly comprises a floor-to-ceiling wall assembly.

11. The modular wall assembly of claim 5, wherein the at least one mounting arrangement allows vertical adjustment of the sliding support member with respect to the frame assembly.

* * * * *